United States Patent
Berger et al.

(10) Patent No.: US 6,632,128 B2
(45) Date of Patent: Oct. 14, 2003

(54) ANGLE GRINDER WITH ELECTRIC DRIVE

(75) Inventors: Guenther Berger, deceased, late of Notzingen (DE), by Marianne Berger, Frank Berger, heirs; by Carola Bianca Berger, heir, Neurtingen-Raidwangen (DE); Roland Walz, Stuttgart (DE); Peter Stierle, Waldenbuch (DE); Ralph Dammertz, Stuttgart (DE); Maria-Margareta Sulea, Leinfelden-Echterdingen (DE); Stefan Heess, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 09/914,968

(22) PCT Filed: Dec. 21, 2000

(86) PCT No.: PCT/DE00/04569

§ 371 (c)(1),
(2), (4) Date: Apr. 15, 2002

(87) PCT Pub. No.: WO01/51251

PCT Pub. Date: Jul. 19, 2001

(65) Prior Publication Data
US 2002/0151262 A1 Oct. 17, 2002

(30) Foreign Application Priority Data
Jan. 10, 2000 (DE) ......... 200 00 223

(51) Int. Cl.⁷ .............. B24B 23/00
(52) U.S. Cl. ............. 451/358; 451/344; 451/357; 451/359
(58) Field of Search ............. 451/358, 344, 451/359, 357, 456; 310/47, 50, 239, 240

(56) References Cited

U.S. PATENT DOCUMENTS

| 4,905,423 | A | * | 3/1990 | van Laere ............ 451/461 |
| 5,170,851 | A | * | 12/1992 | Kress et al. ............ 173/29 |
| 5,678,272 | A | * | 10/1997 | McCracken et al. ...... 15/97.1 |
| 5,793,141 | A | * | 8/1998 | Simonsen et al. ....... 310/242 |
| 6,087,754 | A | * | 7/2000 | Berger ................ 310/240 |
| 6,454,640 | B1 | * | 9/2002 | Siedler et al. ......... 451/357 |

FOREIGN PATENT DOCUMENTS

| DE | 33 24 546 A | 1/1985 |
| DE | 37 31 079 A | 3/1989 |
| DE | 92 16 172 U | 3/1994 |
| DE | 198 05 577 A | 9/1998 |
| DE | 297 15 570 U | 1/1999 |

\* cited by examiner

Primary Examiner—Joseph J. Hail, III
Assistant Examiner—Alvin J. Grant
(74) Attorney, Agent, or Firm—Michael J. Striker

(57) ABSTRACT

A power tool (10), in particular an angle grinder, having a housing (12) that receives an electric motor (21) and a gear (26), the motor (21) having a rotor (210) which is guided in rotor bearings (2100) and on one hand carries a collector (2102), which collector can be put into contact with a voltage source via carbon brushes (23) supported in brush plates, is made sturdier and easier to install in that the housing (12) comprises two longitudinally split housing shells (120, 121), and that the brush plates are part of a bearing bridge (24) that carries both the rotor bearing (2100) and the carbon brushes (23), and the bearing bridge (24), in the guide region of the carbon brushes (23), comprises plastic.

7 Claims, 4 Drawing Sheets

Figure 1:
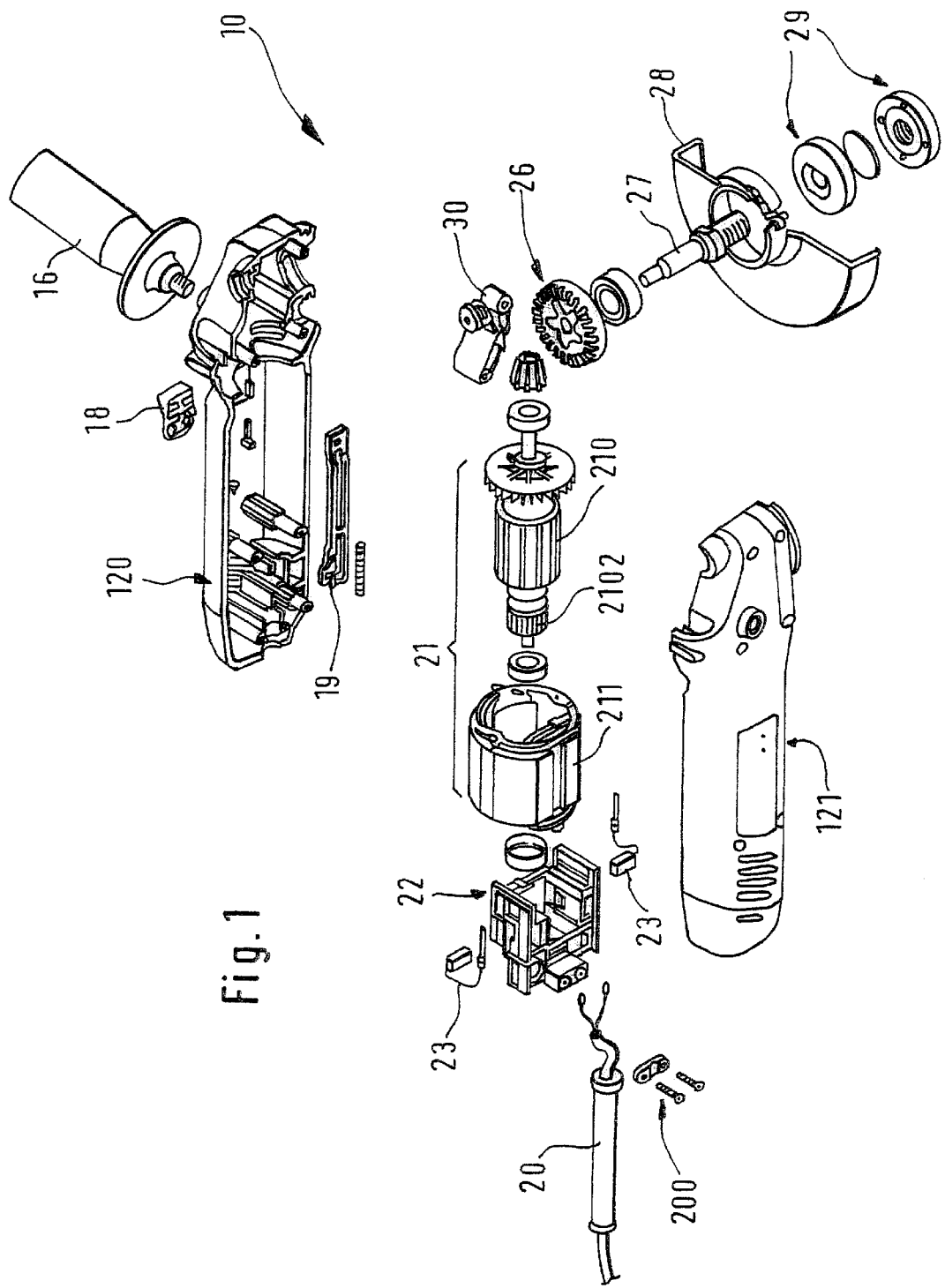

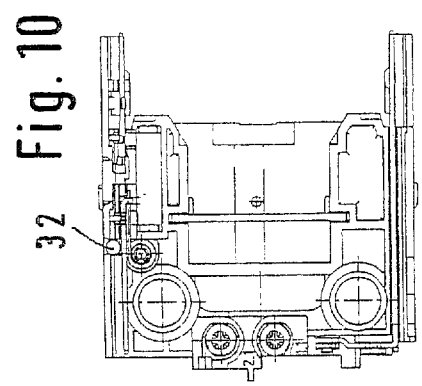
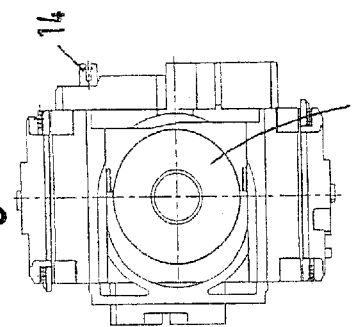

Fig. 11
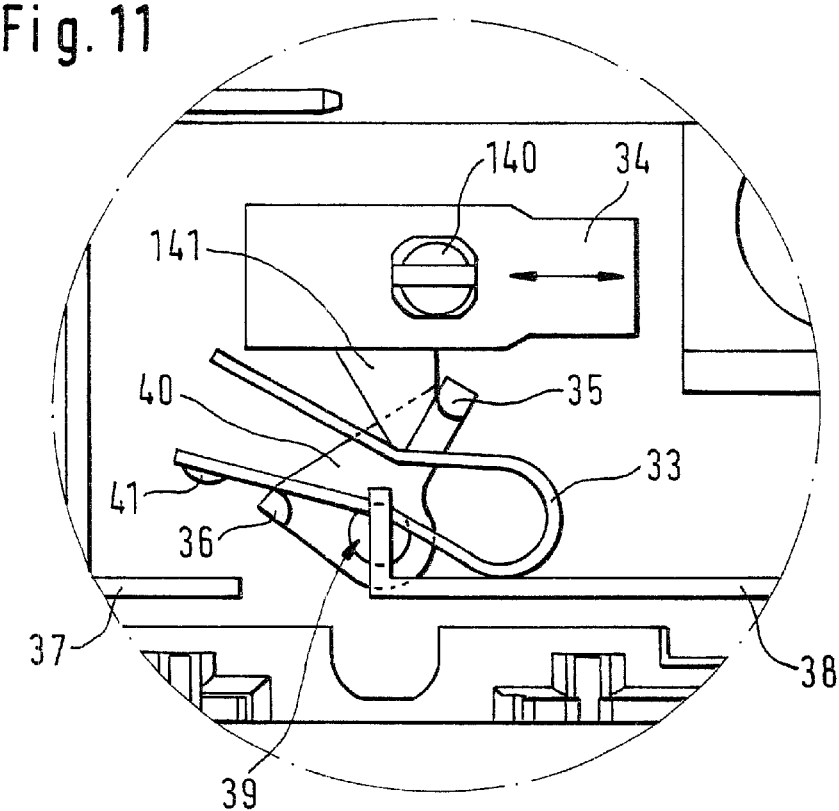
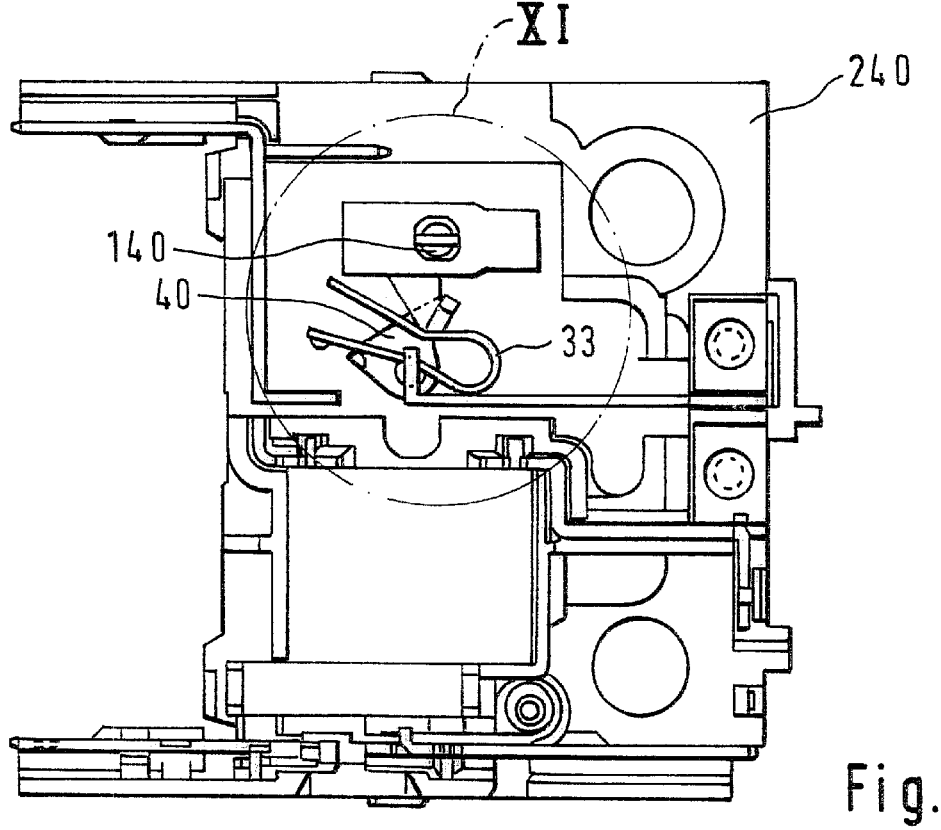
Fig. 12

ANGLE GRINDER WITH ELECTRIC DRIVE

PRIOR ART

The present invention is based on an angle grinder as generically defined by the preamble to claim 1.

In angle grinders of the cup-type design, their electric motors can be put into contact with a voltage source via two carbon brushes each supported in a respective brush plate. The brush plates that can be fastened to the housing are of plastic and each carries a metal cage, which serves the purpose of retaining and displaceably guiding the carbon brushes and which can be connected toward the voltage source to a cord with contact terminals.

This type of arrangement is relatively complicated and requires major effort of assembly as well as expensive, dimensionally stable housing parts.

ADVANTAGES OF THE INVENTION

The angle grinder of the invention having the characteristics of claim 1 has the advantage of especially favorable production costs.

Because the housing comprises two longitudinally split housing shells, and the brush plates are part of a bearing bridge that carries both the rotor bearing and the carbon brushes, and the bearing bridge, in the guide region of the carbon brushes, comprises plastic, the precision of the relationship of the rotor bearing and the carbon brushes can be attained better and more simply.

Because the guide region of the carbon brushes is designed as a shaft of square cross section and one of the four sides of the shaft is of metal, in particular sheet brass, the walls of the shaft can be dimensioned as relatively thin, yet the mechanical load-bearing capability is especially high, especially because of the forces that are operative in the rotational direction of the motor between the collector and the carbon brushes when the angle grinder is used as intended.

Because the cord of the carbon brushes can be held firmly in indentations of the bearing bridge, and in particular can be clamped with a rubber stopper, an economical standard carbon brush can be used in conjunction with the bearing bridge.

Because the cord has a plug on its free end, which in particular is crimped onto this end and can be locked releasably in detent fashion to the bearing bridge, the carbon brush is easy to replace.

Because the bearing bridge has an integrated switch, which is provided with means that force the switch open as the toggle switch is switched off, an unwanted closure of the switch and the attendant adverse consequences, such as oxidation of the collector, are precluded.

Because the bearing bridge carries the rotor bearing set in a rubber bush, low-vibration operation of the angle grinder is assured.

DRAWING

The invention is explained in further detail below in terms of an exemplary embodiment in conjunction with the drawing.

Shown are

Figure 2:
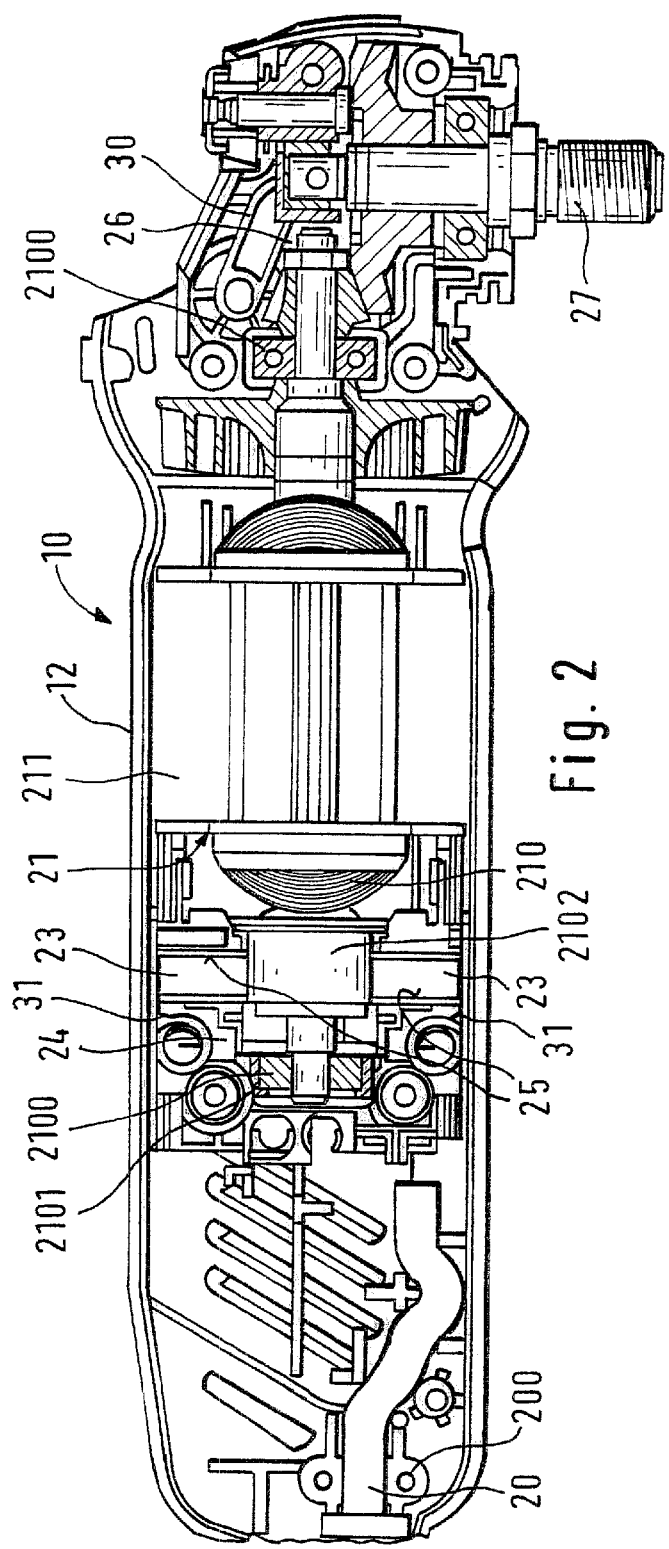
Figure 3:
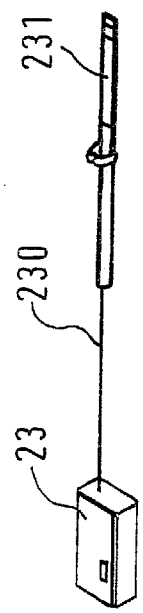
Figure 4:
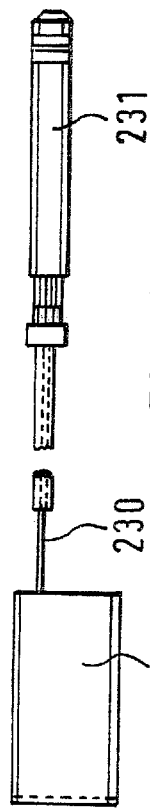

FIG. 1, an exploded view of the angle grinder of the invention;

FIG. 2, a longitudinal section through the angle grinder;

FIG. 3, a three-dimensional view of the carbon brush;

FIG. 4, a side view of the carbon brush;

FIG. 5, a view of the bearing bridge from above;

FIG. 6, a side view of the bearing bridge from the left;

FIG. 7, a view of the bearing bridge from below;

FIG. 8, a view of the bearing bridge from behind;

FIG. 9, a view of the bearing bridge from the front;

FIG. 10, a side view of the bearing bridge from the right;

FIG. 11, a side view of a variant of the bearing bridge, similar to FIG. 6, from the left with a switch rocker; and FIG. 12, an enlarged detail in the region of the switch rocker.

EXEMPLARY EMBODIMENT

FIG. 1 shows an exploded view of a power tool designed as an angle grinder. Its housing 12 comprises a first and second housing shell 120, 121. The first housing shell 120 has a longitudinally displaceable toggle switch 18 on the side, for actuating a switch 15. The first housing shell 120 also has an extra handle 16 for additionally holding and guiding the angle grinder with the second hand.

The toggle switch 18 is coupled to a switch 15 via a switch arm 19 and a switch lug 14. The switch is seated in a bearing bridge 24, which is disposed in the rear region of the housing 12, serves as a brush plate, and carries the two carbon brushes 23.

An electric cable 20 for supplying power to the electric motor 21 emerges from the housing 12 at the back and is firmly restrained on the housing shell 120 via clamping means 200. The motor 21 comprises a stator 211 and a rotor 210, which is supported in the housing 12 on both shaft ends in rotor bearings 2100. The rear end of the rotor 210 having the rotor bearing 2100 is supported in a rubber bush 2101, which in turn is seated in the bearing bridge 24 in a manner fixed against relative rotation. The bearing bridge 24 carries both the switch 15 and the carbon brushes 23, whose cords 230 on each of their free ends have a crimped-on plug 231. The cords 230 can be clamped in groovelike indentations 240 of the bearing bridge 24. Serving as clamping means are cylindrical rubber stoppers 32, whose diameter is slightly greater than the inside diameter of the indentations 240.

On each of diametrically opposed sides, the bearing bridge 24 has a respective shaft 25 for guiding a carbon brush 23. The carbon brushes are pressed into the shaft toward the collector 24, each by means of a respective spring 31.

The shafts 25 are made of plastic on three sides each, while the fourth side, located in the direction of rotation of the collector 2102, comprises sheet brass. The brush spark also impacts this side in operation of the angle grinder 10. This protects the plastic base body. On the outside, in extensions of the indentations 240, the bearing bridge 24 also has detent-lockable openings for insertion of the plugs 231 crimped on the ends of the cords 230. As a result, the bearing bridge 24 can be attached to the stator 21 in the manner of a plug contact, and secure electrical contacting between the carbon brushes 23 and the stator 211 is thus possible as well.

Furthermore, between the switch lug 14 and the bearing bridge 24, the bearing bridge 24 has a switch rocker 33, which as a servo device, after the briefest possible switching actuation path of the toggle switch 18 or switch arm 19 or switch lug 14, executes the switching operation in the indicated switching direction spring-elastically, especially quickly and effectively.

This is clearly shown in FIGS. 11 and 12, which show a variant of a bearing bridge 240 from the left that can be actuated in the region of the switch lug 140 in the direction of the arrow 34. The switch lug 140, via the indexing cam 141, outputs merely a "control pulse" to the indexing disk 40, which rotates counterclockwise or clockwise about the pivot point 39.

The operations of switching on and off are reinforced by the switch rocker 33, designed as a U-shaped spring element, in that this element is seated in prestressed fashion between two axially protruding cams 36, 37 of the indexing disk 40 and drives this disk or causes it to jump, depending on the actuation direction, so that either the contact point 41 comes into contact with the conductor track 37 toward the pole piece, or the contact point is torn away from it.

In the front region of the housing 12, the motor 21 is adjoined by a gear 26, which ends in a work spindle 27 that can be driven to rotate via two cone wheels, not identified by reference numeral, that is, a small cone wheel and a ring gear of an angular gear. The end of the work spindle 29 is surrounded by a protective hood 28 and is designed to receive two clamping flanges 29, between which a grinding wheel can be clamped.

The front region of the housing 12, between the housing shells 120, 121, also has an insert part 30 to reinforce the plastic and to receive a spindle stop, not identified by reference numeral, in order to stop the ring gear.

What is claimed is:

1. A power tool (10), in particular an angle grinder, having a housing (12) that receives an electric motor (21) and a gear (26), the motor (21) having a rotor (210) which is guided in rotor bearings (2100) and on one hand caries a collector (2102), which collector can be put into contact with a voltage source via carbon brushes (23) supported in brush plates, characterized in that the housing (12) comprises two longitudinally split housing shells (120, 121), and that the brush plates are part of a bearing bridge (24) that carries both the rotor bearing (2100) and the carbon brushes (23), and the bearing bridge (24), in the guide region of the carbon brushes (23), comprises plastic, wherein the guide region of the carbon brushes (23) is designed as a shaft (25) of square cross section.

2. A power tool (10), in particular an angle grinder, having a housing (12) that receives an electric motor (21) and a gear (26), the motor (21) having a rotor (210) which is guided in rotor bearings (2100) and on one hand carries a collector (2102), which collector can be put into contact with a voltage source via carbon brushes (23) supported in brush plates, characterized in that the housing (12) comprises two longitudinally split housing shells (120, 121), and that the brush plates are part of a bearing bridge (24) that carries both the rotor bearing (2100) and the carbon brushes (23), and the bearing bridge (24), in the guide region of the carbon brushes (23), comprises plastic, wherein the guide region of the carbon brushes (23) is designed as a shaft (25) of square cross section, wherein one of the four sides of the shaft (25) is of metal, in particular sheet brass.

3. The power tool of claim 2, characterized in that the side of the shaft (25) toward which the carbon brushes (23) are pressed when the motor (21) is operated as intended comprises sheet brass.

4. A power tool (10), in particular an angle grinder, having a housing (12) that receives an electric motor (21) and a gear (26), the motor (21) having a rotor (210) which is guided in rotor bearings (2100) and on one hand carries a collector (2102), which collector can be put into contact with a voltage source via carbon brushes (23) supported in brush plates, characterized in that the housing (12) comprises two longitudinally split housing shells (120, 121), and that the brush plates are part of a bearing bridge (24) that carries both the rotor bearing (2100) and the carbon brushes (23), and the bearing bridge (24), in the guide region of the carbon brushes (23), comprises plastic, wherein the cord (230) of the carbon brushes (23) can be held firmly in indentations (240) of the bearing bridge (24), and in particular can be clamped with a rubber stopper (32).

5. The power tool of claim 4, characterized in that the cord (230) has a plug (231) on its free end, which in particular is crimped onto this end and can be locked releasably in detent fashion to the bearing bridge (24).

6. A power tool (10), in particular an angle grinder, having a housing (12) that receives an electric motor (21) and a gear (26), the motor (21) having a rotor (210) which is guided in rotor bearings (2100) and on one hand carries a collector (2102), which collector can be put into contact with a voltage source via carbon brushes (23) supported in brush plates, characterized in that the housing (12) comprises two longitudinally split housing shells (120, 121), and that the brush plates are pad of a bearing bridge (24) that carries both the rotor bearing (2100) and the carbon brushes (23), and the bearing bridge (24), in the guide region of the carbon brushes (23), comprises plastic, wherein the bearing bridge (24) has an integrated switch (15), which is provided with means that force the switch (15) open as the toggle switch (18) is switched off.

7. A power tool (10), in particular an angle grinder, having a housing (12) that receives an electric motor (21) and a gear (26), the motor (21) having a rotor (210) which is guided in rotor bearings (2100) and on one hand carries a collector (2102), which collector can be put into contact with a voltage source via carbon brushes (23) supported in brush plates, characterized in that the housing (12) comprises two longitudinally split housing shells (120, 121), and that the brush plates are part of a bearing bridge (24) that carries both the rotor bearing (2100) and the carbon brushes (23), and the bearing bridge (24), in the guide region of the carbon brushes (23), comprises plastic, wherein the bearing bridge (24) carries the rotor bearing (2100) set in a rubber bush (2101).

* * * * *